(12) United States Patent  
Shimomura et al.

(10) Patent No.: US 6,690,131 B1
(45) Date of Patent: Feb. 10, 2004

(54) POWER WINDOW SWITCH CIRCUIT

(75) Inventors: Yasuhiro Shimomura, Aichi (JP); Kozo Nishimura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 51 days.

(21) Appl. No.: 10/048,819
(22) PCT Filed: Aug. 1, 2000
(86) PCT No.: PCT/JP00/05077
§ 371 (c)(1),
(2), (4) Date: Feb. 1, 2002
(87) PCT Pub. No.: WO01/09468
PCT Pub. Date: Feb. 8, 2001

(30) Foreign Application Priority Data

Aug. 2, 1999 (JP) .......................................... 11-219247
Aug. 2, 1999 (JP) .......................................... 11-219248

(51) Int. Cl.[7] ........................... G05D 1/00; H02H 7/08; E05F 15/00
(52) U.S. Cl. ........................ 318/445; 318/643; 49/139
(58) Field of Search ................................ 318/445, 643, 318/266, 282, 257, 286, 466, 469; 49/139, 349; 307/116, 125; 701/10.1, 49

(56) References Cited

U.S. PATENT DOCUMENTS

| | | | | |
|---|---|---|---|---|
| 5,994,797 A | * | 11/1999 | Yamaoka | 307/125 |
| 6,031,296 A | * | 2/2000 | Takagi et al. | 307/10.1 |
| 6,157,152 A | * | 12/2000 | Sekine et al. | 318/266 |
| 6,281,647 B1 | * | 8/2001 | Sasaki | 318/264 |
| 6,417,636 B2 | * | 7/2002 | Takagi | 318/445 |
| 6,437,531 B1 | * | 8/2002 | Kawamura | 318/445 |
| 6,459,168 B1 | * | 10/2002 | Miyake et al. | 307/10.1 |
| 6,486,630 B2 | * | 11/2002 | Takagi | 318/445 |

FOREIGN PATENT DOCUMENTS

| | | | |
|---|---|---|---|
| EP | 0 889 192 A2 | 1/1999 | |
| JP | 11-022300 | 1/1999 | |
| JP | 11-062385 | 3/1999 | |
| JP | 11081795 A | * 3/1999 | ........... E05F/15/00 |
| JP | 2000034861 A | * 2/2000 | ........... E05F/15/10 |
| JP | 2000268660 A | * 9/2000 | ........... H01H/9/54 |
| JP | 2000282746 A | * 10/2000 | ........... E05F/15/08 |
| JP | 2002136166 A | * 5/2002 | ........... H02P/5/06 |
| JP | 2002276241 A | * 9/2002 | ........... E05F/15/10 |

* cited by examiner

Primary Examiner—Robert Nappi
Assistant Examiner—Patrick L Miller
(74) Attorney, Agent, or Firm—Crompton, Seager & Tufte, LLC

(57) ABSTRACT

A power window switch circuit, even if soaked, prevents windows from opening or closing unintentionally. A DOWN switch (128) and an UP switch (129) each include a first fixed contact (DN1, UP1) connected with a power supply, a second fixed contact (DN2, UP2) grounded, and movable contacts (131, 132, 133, 134) for selectively connects either the first or second fixed contact with the first terminal of corresponding relay coils (21, 23). A transistor (TR4) responsive to a soak signal is connected between the ground and the second fixed contacts (DN2, UP2) of the UP and DOWN switches. The second terminals of the first and second relay coils are grounded through their respective transistors. When a soak is detected, a soak detector (15) supplies a soak signal to the transistors.

19 Claims, 3 Drawing Sheets

POWER WINDOW SWITCH CIRCUIT

BACKGROUND OF THE INVENTION

The present invention relates to a power window switch circuit, and more particularly, it relates to a power window switch circuit having a drive motor, a relay, a switch and the like for raising and lowering a window glass.

BRIEF SUMMARY OF THE INVENTION

In general, a vehicle has a power window apparatus for opening and closing a window glass of a side door and the like, and the power window apparatus includes an UP switch (raising switch) and a DOWN switch (lowering switch) manually operated for raising and lowering the window glass.

FIG. 1 schematically shows an electric circuit of a power window switch circuit 10 in a conventional power window apparatus. The power window switch circuit 10 includes a DOWN switch 28, an UP switch 29, an automatic switch 30, a control circuit 12, a drive circuit 20, and a drive motor M which is preferably a DC motor for raising and lowering a window glass. The drive circuit 20 includes a first relay 22, a second relay 24, and transistors TR1 to TR3. The DOWN switch 28 and the UP switch 29 are used, for example, as a tumbler two-stepped click type switch. The DOWN switch 28 has a first knob (hereinafter referred to as "the DOWN side knob"), and a second knob (hereinafter referred to as "the UP side knob"). When the DOWN side knob is pressed by one step, a movable contact 31 of the DOWN switch 28 is connected to a fixed contact DN. When the UP side knob is pressed by one step, a movable contact 32 of the UP switch 29 is connected to a fixed contact UP. When the DOWN side knob is pressed by two steps, the DOWN switch 28 and the automatic switch 30 are both turned on. Moreover, when the UP side knob is pressed by two steps, the UP switch 29 and the automatic switch 30 are both turned on. In the automatic operation, after the knob is pressed by two steps, the DOWN switch 28 or the UP switch 29 is turned off but the automatic switch 30 is maintained in ON state for a predetermined period of time.

When the automatic switch 30 and the DOWN switch 28 are turned on, the control circuit 12 continues to supply a high (H) level relay drive signal to the base of the transistor TR3 even after the DOWN switch 28 is turned off, until the window glass reaches a completely open position, and supplies an ON signal to the base of the transistor TR1, thereby turning on the transistors TR1 and TR3. This supplies excitation current to the relay coil 21 of the first relay 22. When the relay coil 21 is excited, the movable contact 25c of the relay contact 25 is switched from a ground side fixed contact 25a to a power supply side fixed contact 25b, and the drive motor M is supplied with the drive current and rotated in normal direction. The drive motor M drives a wire-type or arm-type regulator (not shown) so as to lower the window glass. When the window glass reaches the completely open position, a completely open position limit switch (not depicted) begins to operate. In response to this switch operation, the control circuit 12 stops drive of the drive motor M by the relay drive signal and maintains the window glass at the completely open position.

When the automatic switch 30 and the UP switch 29 are turned on, the control circuit 12 continues to supply a high (H) level relay drive signal to the base of the transistor TR2 even after the UP switch 29 is turned off, until the window glass reaches a completely closed position, and supplies an ON signal to the base of the transistor TR1, thereby turning on the transistors TR1 and TR2. This supplies excitation current to the relay coil 23 of the second relay 24. When the relay coil 23 is excited, the movable contact 26c of the relay contact 26 is switched from a ground side fixed contact 26a to a power supply side fixed contact 26b, and the drive motor M is rotated in reverse direction. The drive motor M drives the regulator (not shown) so as to raise the window glass. When the window glass reaches the completely closed position, a completely closed position limit switch (not shown) begins to operate. In response to this switch operation, the control circuit 12 stops drive of the drive motor M by the relay drive signal and maintains the window glass at the completely closed position.

When the DOWN side knob is operated to turn on the DOWN switch 28, the control circuit 12 supplies a high (H) level relay drive signal to the base of the transistor TR3 and supplies the ON signal to the base of the transistor TR1, thereby turning on the transistors TR1 and TR3. Accordingly, while the DOWN switch 28 is in ON state, excitation current is supplied to the relay coil 21 and drive motor M is rotated in the normal direction, thereby lowering the window glass.

When the UP side knob is operated to turn on the UP switch 29, the control circuit 12 supplies the high (H) level relay drive signal to the base of the transistor TR2 and supplies the ON signal to the base of the transistor TR1, thereby turning on the transistors TR1 and TR2. Accordingly, while the UP switch 29 is in ON state, excitation current is supplied to the relay coil 23 and drive motor M is rotated in the reverse direction, thereby raising the window glass.

When the first relay 22, the second relay 24, and the control circuit 12 are soaked by an electrolyte liquid such as rain, leak resistance R11 to R15 may be caused as shown by dotted lines in FIG. 1.

For example, even if the DOWN switch 28 is turned off and the control circuit 12 does not supply the ON signal and the H level relay drive signal to the transistors TR1 and TR3, respectively, the transistors TR1 and TR3 are turned on by the leak resistance R11 and R13. This excites the relay coil 21, and the movable contact 25c is connected to the power supply side fixed contact 25b, which rotates the drive motor M in the normal direction and unintentionally lowers the window glass.

Moreover, even if the UP switch 29 is turned off and the control circuit 12 does not supply the ON signal and the H level relay drive signal to the transistors TR1 and TR2, respectively, the transistors TR1 and TR2 are turned on by the leak resistance R11 and R12. This excites the relay coil 23, and the movable contact 26c is connected to the power supply side fixed contact 26b, which rotates the drive motor M in the reverse direction and unintentionally raises the window glass.

Furthermore, even if the transistor TR3 is in OFF state, generation of leak resistance R11 and R15 may excite the relay coil 21, which in turn rotates the drive motor M in the normal direction to lower the window glass unintentionally. Furthermore, even if the transistor TR2 is in OFF state, generation of leak resistance R11 and R14 may excite the relay coil 23, which in turn rotates the drive motor M in the reverse direction to raise the window glass unintentionally.

When the leak resistance R11 to R13 are generated, the transistors TR1 to TR3 are turned on, the relay coils 21 and 23 are excited, and the movable contacts 25c and 26c are connected to the power supply side fixed contacts 25b and 26b, respectively. In this case, identical voltage is applied to both the terminals of the drive motor M. Accordingly, even if the DOWN side knob or the UP side knob is operated, the drive motor M is not driven and the window glass is not raised or lowered.

When the leak resistance R11, R14, and R15 are generated, the transistor TR1 is turned on by the leak resistance R11, the relay coils 21 and 23 are excited, and identical voltage is applied to both the terminals of the drive motor M. Accordingly, even if the DOWN side knob or the UP side knob is operated in this state, the drive motor M is not driven and the window glass is not raised or lowered.

As has been described above, depending on the position where leak resistance is generated, four possible states should be considered: (a) only the UP side relay coil 23 is excited; (b) only the DOWN side relay coil 21 is excited; (c) both of the relay coils 21 and 23 are excited; (d) neither the relay coils 21 nor 23 is excited. Accordingly, when the power window switch circuit 10 is soaked, it cannot be decided whether the window glass is raised or lowered. As a result, movement of the power window switch circuit 10 which is operated by a person in the vehicle cannot be properly achieved.

DETAILED DESCRIPTION OF THE PREFERRED EMBODIMENTS

It is therefore an object of the present invention to provide a power window switch circuit which can prevent the unintentional raising or lowering of a window glass when the power window switch circuit is soaked.

According to a first embodiment of the present invention, there is provided a power window switch circuit which includes a first relay coil having two terminals; a down switch connected to the first relay coil for lowering a window glass; a second relay coil having two terminals; and an up switch connected to the second relay coil for raising a window glass. Each of the down switch and the up switch includes a first fixed contact connected to a power supply; a second fixed contact connected to the ground; and a movable contact selectively connecting one of the first and the second fixed contact to a first terminal of the corresponding relay coil. A first switching element responsive to a soak detection signal is connected between the second fixed contacts of the down switch and the up switch and the ground. The first switching element is also connected between second terminals of the first and second relay coils and the ground. The power window switch circuit further includes a soak detection circuit for supplying the soak detection signal to the first switching element when detecting the soak.

According to a second embodiment of the present invention, there is provided a power window switch circuit which includes a first relay coil having two terminals; a down switch connected to the first relay coil for lowering a window glass, a second relay coil having two terminals; and an up switch connected to the second relay coil for raising the window glass. The down switch includes a first fixed contact connected to a power supply; a second fixed contact connected to a first terminal of the first relay coil; and first and second movable contacts corresponding to the first and second fixed contacts. The up switch includes a third fixed contact connected to a power supply; a fourth fixed contact connected to a first terminal of the second relay coil; and third and fourth movable contacts corresponding to the third and fourth fixed contacts. A first switching element is connected between the first movable contact of the down switch and a first terminal of the first relay coil. A second switching element is connected between the third movable contact of the up switch and a first terminal of the second relay coil. A third switching element is connected between the second and fourth movable contacts of the down switch and the up switch and the ground. The third element turns on one of the first and second switching elements when turned on in response to a soak detection signal. The power window switch circuit further includes a soak detection circuit for supplying the soak detection signal to the third switching element when detecting the soak.

DETAILED DESCRIPTION OF THE PREFERRED EMBODIMENTS

Figure 1:
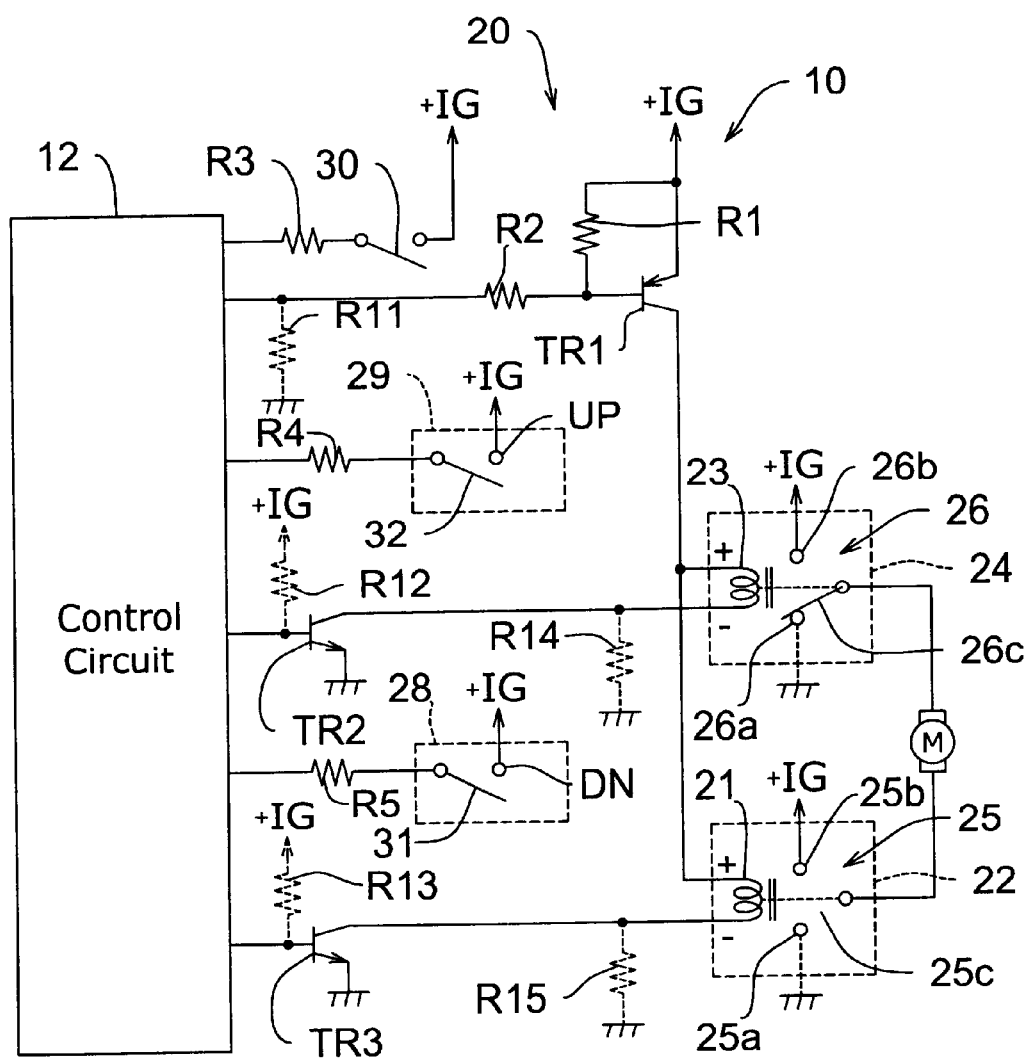
FIG. 1 is a schematic electric circuit diagram of a conventional power window switch circuit.
Figure 2:
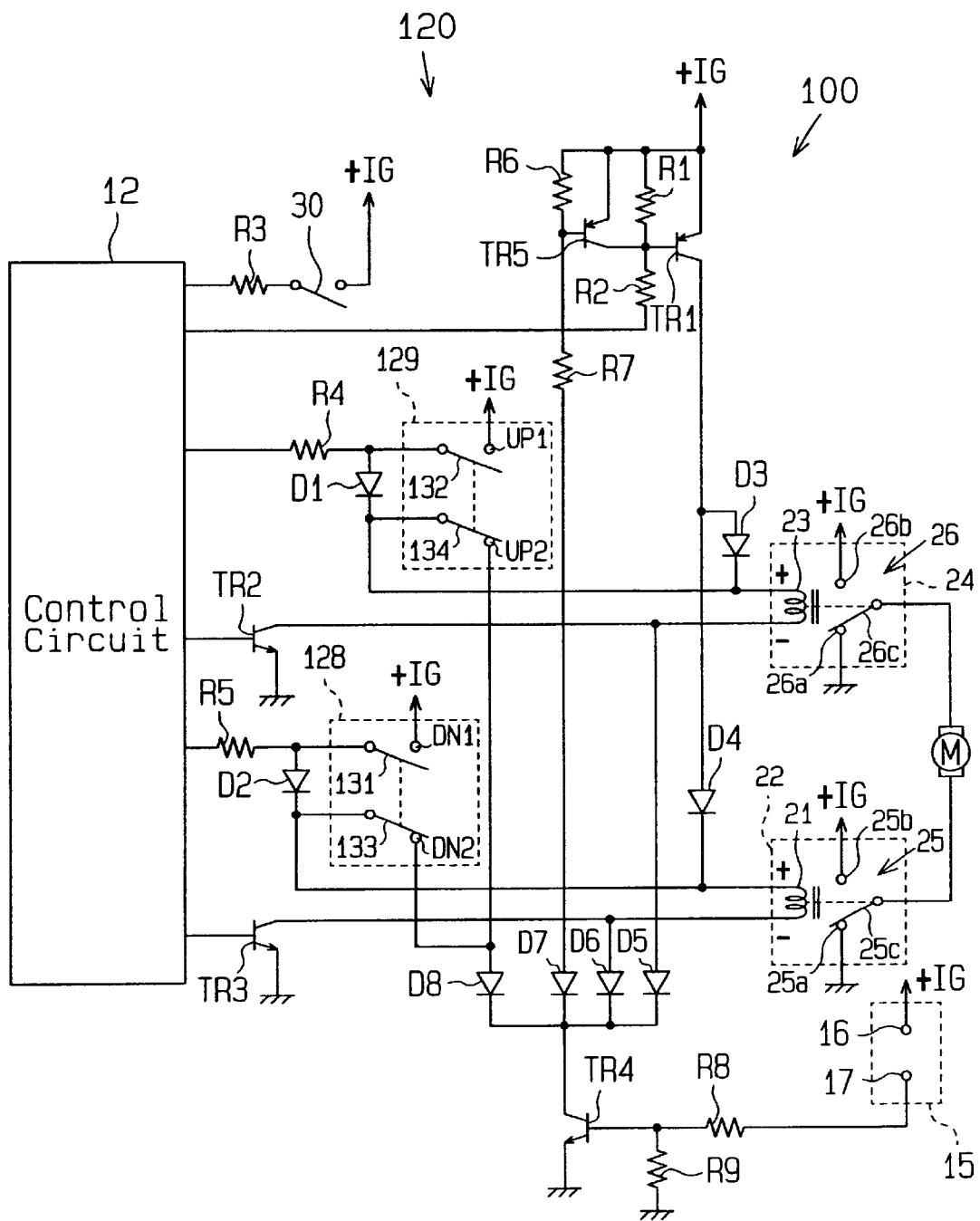
FIG. 2 is a schematic electric circuit diagram of a power window switch circuit according to a first embodiment of the present invention.

FIG. 2 schematically shows an electric circuit of a power window switch circuit 100 in an automobile power window apparatus according to a first embodiment of the present invention. It should be noted that like components as in FIG. 1 are denoted by identical reference symbols. The power window apparatus is provided at a side door of the driver seat side. The power window switch 100 includes a control circuit 12, a drive circuit 120, a DOWN switch 128, an UP switch 129, an automatic switch 30, and a drive motor M. The drive circuit 120 includes a first relay 22, a second relay 24, transistors TR1 to TR3 and diodes D1 to D4.

Between a plus (+) terminal (shown by "+IG" in FIG. 2) and a minus (−) terminal (shown by the symbol for the ground in FIG. 2) of a battery power supply, the transistor TR1, the diode D4, the relay coil 21 of the first relay 22, and the transistor TR3 are connected in series. Between an anode of the diode D4 and the ground, the diode D3, a relay coil 23 of the second relay 24, and the transistor TR2 are connected in series. A resistor R1 is connected between the plus terminal of the power supply and the transistor TR1. A base of the transistor TR1 is connected via the resistor R2 to the control circuit 12. The transistors TR2 and TR3 have bases connected to the control circuit 12.

The DOWN switch 128 is a dipole single setting switch including: a first fixed contact DN1 connected to the plus terminal of the power supply; a first movable contact 131 and a second movable contact 133 connected to each other via the diode D2; and a second fixed contact DN2. The DOWN switch 128 constitutes a false transfer contact. When the DOWN switch 128 is turned off, the second movable contact 133 is connected to the second fixed contact DN2 and the first movable contact 131 is not connected to the first fixed contact DN1. That is, the first movable contact 131 functions as a constantly open contact with respect to the first fixed contact DN1, while the second movable contact 133 functions as a constantly closed contact with respect to the second fixed contact DN2. The first movable contact 131 is connected via a resistor R5 to the control circuit 12, while the second movable contact 133 is connected to the plus terminal of the relay coil 21. The second fixed contact DN2 is connected to the anode of the diode D8.

The UP switch 129 is a dipole single setting switch including: a first fixed contact UPI connected to the plus terminal of the power supply; a first movable contact 132 and a second movable contact 134 connected to each other via the diode D1; and a second fixed contact UP2. The UP switch 129 constitutes a false transfer contact. When the UP switch 129 is turned off, the second movable contact 134 is connected to the second fixed contact UP2 and the first movable contact 132 is not connected to the first fixed contact UP1. That is, the first movable contact 132 functions as a constantly open contact with respect to the first fixed contact UP1, while the second movable contact 134 functions as a constantly closed contact with respect to the second fixed contact UP2. The first movable contact 132 is connected via a resistor R4 to the control circuit 12, while the second movable contact 134 is connected to the plus terminal of the relay coil 23. The second fixed contact UP2 is connected to the anode of the diode D8.

The automatic switch 30 has a fixed contact connected to the plus terminal of the power supply and a movable contact connected via a resistor R3 to the control circuit 12.

The first relay 22 has a relay contact 25 including a movable contact 25c connected to the first terminal of the drive motor M, a power supply side fixed contact 25b connected to the plus terminal of the power supply, and a ground side fixed contact 25a connected to the ground. When the relay coil 21 is in a deexcited state, the movable contact 25c is connected to the ground side fixed contact 25a and when the relay coil 21 is excited, the movable contact 25c is connected to the power supply side fixed contact 25b.

The second relay 24 has a relay contact 26 including a movable contact 26c connected to the second terminal of the drive motor M, a power supply side fixed contact 26b connected to the plus terminal of the power supply, and a ground side fixed contact 26a connected to the ground. When the relay coil 23 is in the deexcited state, the movable contact 26c is connected to the ground side fixed contact 26a and when the relay coil 23 is excited, the movable contact 26c is connected to the power supply side fixed contact 26b.

The drive circuit 120 further includes a leak detection circuit 15 as a soak detection circuit, transistors TR4 and TR5, diodes D5 to D8, and resistors R6 to R9. Each of the diodes D1 to D8 functions as a diode for preventing back flow.

The leak detection circuit 15 has an electrode 16 connected to the plus terminal of the power supply and an electrode 17 connected via the base resistor R8 to the base of the transistor TR4. The electrodes 16 and 17 are arranged at a predetermined distance from each other. When leak is caused between the electrodes 16 and 17 of the leak detection circuit 15, leak resistance is generated between the electrodes 16 and 17 to turn on the leak detection circuit 15. When no leak is present between the electrodes 16 and 17, the leak detection circuit 15 is turned off. It is preferable that the leak detection circuit 15 be located at a position identical to or in the vicinity of the control circuit 12.

The resistor 9 is connected between the base of the transistor TR4 and the ground. The transistor TR4 has an emitter grounded and a collector connected to respective cathodes of the diodes D5 to D8. The diode D5 has an anode connected to the minus terminal of the relay coil 23, the diode D6 has an anode connected to the minus terminal of the relay coil 21, and the diode D7 has an anode connected via the resistor R7 to the base of the transistor TR5. The resistor R6 is connected between the plus terminal of the power supply and the base of the transistor TR5. The transistor TR5 has an emitter connected to the plus terminal of the power supply and a collector connected to the base of the transistor TR1.

In the first embodiment, the relay coil 21 constitutes the first relay coil and the relay coil 23 constitutes the second relay coil. The first movable contact 131 and the second movable contact 133 constitute a movable contact portion. The first movable contact 132 and the second movable contact 134 constitute a movable contact portion. The DOWN switch 128 and the diode D2 constitute a DOWN switch circuit. The UP switch 129 and the diode D1 constitute an UP switch circuit. The transistor TR1 constitutes a second switching element, the transistor TR4 constitutes a first switching element, and the transistor TR5 constitutes invalidation means. The plus terminal of the power supply constitutes a power supply side terminal and the anode of the diode D8 constitutes a ground side terminal.

Next, explanation will be given on the function of the power window switch circuit 100.

Firstly, explanation will be given on operation of the power window switch circuit 100 when not soaked by an electrolyte liquid such as rain and when the DOWN switch 128 and the UP switch 129 are both in an OFF state, i.e., in a non-operation state. In this case, the second movable contacts 133 and 134 are connected to the second fixed contacts DN2 and UP2, respectively, and the first movable contacts 131 and 132 are not connected to the first fixed contacts DN1 and UP1. Furthermore, the transistors TR1 to TR3 are in an OFF state. Consequently, no power supply voltage is supplied from the plus terminal of the power supply to the plus terminals and minus terminals of the relay coils 21 and 23. Therefore, the relay coils 21 and 23 are not excited. Consequently, the drive motor M is not driven and the window glass is not lowered or raised.

Next, when the DOWN side knob is operated in this state, the second movable contact 133 is disconnected from the second fixed contact DN2 and with a slight delay, the first movable contact 131 is connected to the first fixed contact DN1 to turn on the DOWN switch 128. In response to the ON operation of the DOWN switch 128, the control circuit 12 turns on the transistors TR1 and TR3. Thus, the relay coil 21 is excited and the drive motor M is rotated in the normal direction to lower the window glass.

Next, when the UP side knob is operated in this state, the second movable contact 134 is disconnected from the second fixed contact UP2 and with a slight delay, the first movable contact 132 is connected to the first fixed contact UP1 to turn on the UP switch 129. In response to the ON operation of the UP switch 129, the control circuit 12 turns on the transistors TR1 and TR2. Thus, the relay coil 23 is excited and the drive motor M is rotated in the reverse direction to raise the window glass.

Next, explanation will be given on operation of the power window switch circuit 100 which is soaked by an electrolyte liquid such as rain and when the DOWN switch 128 and the UP switch 129 are both in the OFF state, i.e., in the non-operation state. In this case, the soak causes leak between the electrodes 16 and 17 of the leak detection circuit 15, and the leak detection circuit 15 is turned on. Then, the transistors TR4 and TR5 are turned on. In response to the ON operation of the transistor TR5, the transistor TR1 is turned off. That is, operation of the transistor TR1 becomes inactive. The ON operation of the transistor TR4 lowers voltage of the minus terminal of the relay coil 21 via the diode D6 to the ground voltage, and voltage of the minus terminal of the relay coil 23 is lowered via the diode D5 to the ground voltage. Furthermore, voltage of the plus terminal of the relay coil 21 is lowered to the ground voltage via the second movable contact 133, the second fixed contact DN2, and the diode D8, and voltage of the plus terminal of the relay coil 23 is lowered to the ground voltage via the second movable contact 134, the second fixed contact UP2, and the diode D8. Then, terminals of the relay coils 21 and 23 are both set to the ground voltage and accordingly, the movable contacts 25c and 26c are maintained in a connected state to the ground side fixed contacts 25a and 26a. Consequently, both the terminals of the drive motor M are set to the ground voltage and the drive motor does not operate.

Thus, even if leak resistance is generated in the power window switch circuit 100, voltage of both the terminals of the relay coils 21 and 23 are set to the ground voltage by the ON operation of the transistor TR4 and accordingly, the relay coils 21 and 23 are not excited and the drive motor M is not operated. This prevents unintentional lowering or raising of the window glass.

Next, in this state, when the DOWN switch 128 is turned on, the power supply voltage is supplied from the plus terminal of the power supply via the diode D2 to the plus terminal of the relay coil 21 and the relay coil 21 is excited. Here, the transistor TR1 is turned off by the ON operation of the transistor TR5 and the UP switch 129 is also in an OFF state. Accordingly, the power supply voltage is not supplied to the plus terminal of the relay coil 23 and the relay coil 23 is kept in the deexcited state. As a result, only the relay coil 21 is excited and the movable contact 25c of the relay contact 25 is switched to the power supply side fixed contact 25b. The drive motor M is rotated in the normal direction and the window glass is lowered.

Next, when the UP switch 129 is turned on, the power supply voltage is supplied from the plus terminal of the power supply via the diode D1 to the plus terminal of the relay coil 23 and the relay coil 23 is excited. Here, the transistor TR1 is turned off by the ON operation of the transistor TR5 and the DOWN switch 128 is also in the OFF state. Accordingly, the power supply voltage is not supplied to the plus terminal of the relay coil 21 and the relay coil 21 is kept in the deexcited state. As a result, only the relay coil 23 is excited and the movable contact 26c of the relay contact 26 is switched to the power supply side fixed contact 26b. The drive motor M is rotated in the reverse direction and the window glass is raised.

The power window switch circuit 100 of the first embodiment has advantages as follows.

(1) Even if the power window switch circuit 100 is soaked, it is possible to definitely lower or raise the window glass according to the ON operation of the DOWN switch 128 or the UP switch 129.

(2) When the power window switch circuit 100 is soaked and the DOWN switch 128 or the UP switch 129 is in the OFF state, unintentional lowering or raising of the window glass can be prevented.

(3) In the ON operation of the DOWN switch 128 or the UP switch 129, the second movable contact 133 or 134 is disconnected from the second fixed contact DN2 or UP2 and after this, the first movable contact 131 or 132 is connected to the first fixed contact DN1 or UP1. Accordingly, it is possible to prevent dead short (in the first embodiment, short-circuit between the plus terminal of the power supply and the anode of the diode D8) when the OFF operation of the second movable contact is performed simultaneously with the ON operation of the first movable contact or when the ON operation of the first movable contact is performed prior to the OFF operation of the second movable contact.

(4) When the power window switch circuit 10 is soaked and the DOWN switch 128 and the UP switch 129 are in the OFF state, the transistor TR1 is in the OFF state because of the ON operation of the transistors TR4 and TR5. Accordingly, even if an ON signal is supplied from the control circuit 12 to the transistor TR1, the transistor TR1 is not turned on and excitation current is not supplied to the relay coils 21 and 23. As a result, it is possible to prevent unintentional lowering or raising of the window glass.

(5) When the first movable contact 131 or 132 of the DOWN switch 128 or the UP switch 129 is connected to the first fixed contact DN1 or UP1, the diode D1 or D2 enables prevention of the current flow from the second movable contact 133 or 134 to the first movable contact 131 or 132. Accordingly, the power supply voltage is definitely supplied from the plus terminal of the power supply via the diode D1 or D2 to the plus terminal of the relay coil 21 or 23. Thus, the relay coil 21 or 23 accurately functions.

It should be noted that the first embodiment may be modified as follows.

In the aforementioned case, the transistors TR1 and TR5 are PNP transistors, but it is also possible to use NPN transistors. In this case, the transistor TR1 has a collector connected to the plus terminal of the power supply and an emitter connected to the anode of the diode D3, while the transistor TR5 has a collector connected to the plus terminal of the power supply and an emitter connected to the base of the transistor TR1.

The transistors TR2 to TR4 which are NPN transistors in the aforementioned case may be replaced by PNP transistors. In this case, the transistor TR2 has an emitter connected to the minus terminal of the relay coil 23 and a collector grounded. Moreover, the transistor TR3 has an emitter connected to the minus terminal of the relay coil 21 and a collector grounded. Furthermore, the transistor TR4 has an emitter connected to the cathode of the diodes D5 to D8 and a collector grounded.

The transistors TR2 and TR3 used in the first embodiment may be replaced by a transistor array having two transistor elements. In this case, it is possible to reduce the size of the power window apparatus.

The first and second relays 22 and 24 used in the first embodiment may be replaced by two relays contained in a single package. In this case, it is possible to reduce the size of the power window apparatus.

Figure 3:
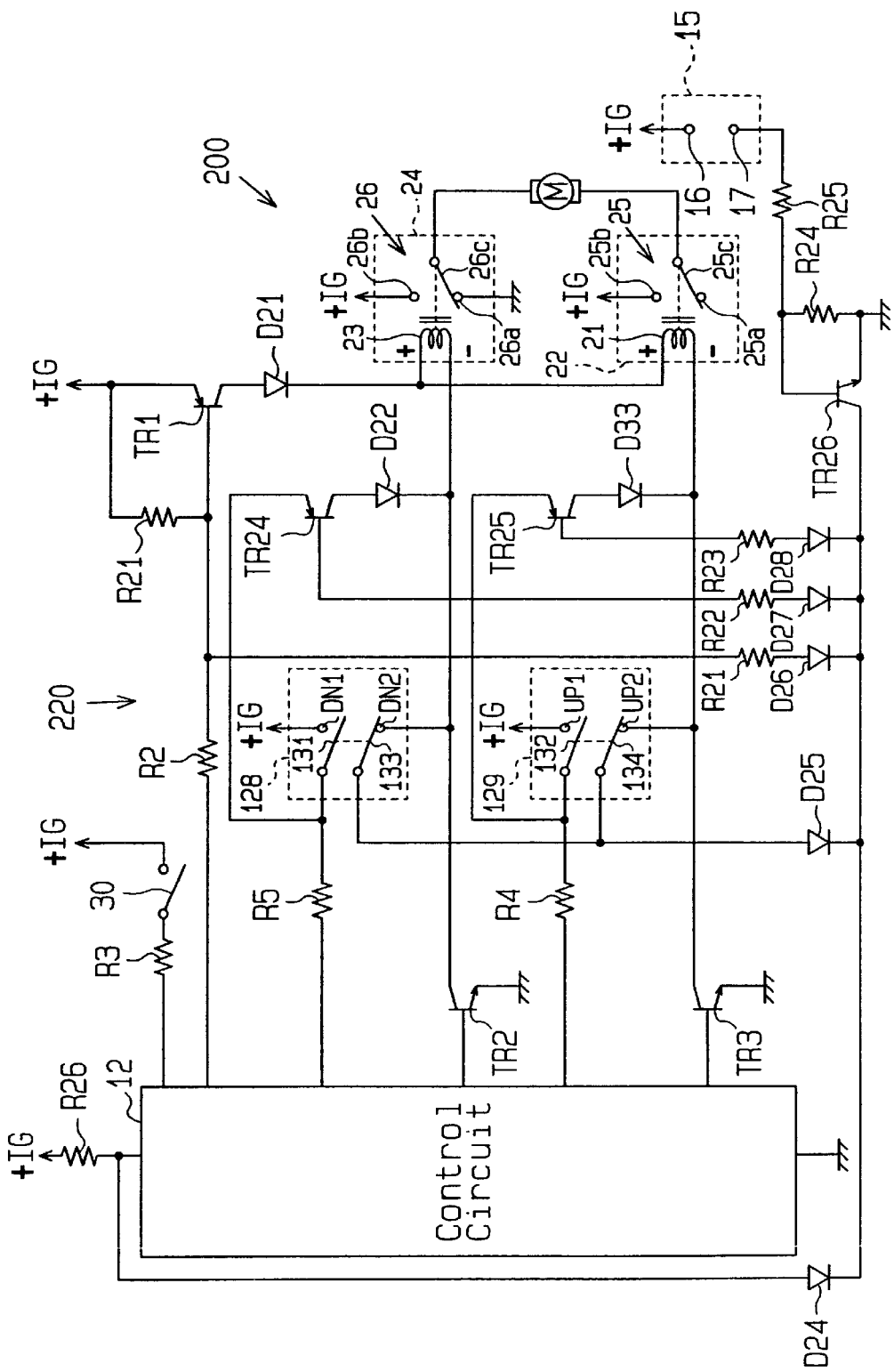
FIG. 3 is a schematic electric circuit diagram of a power window switch circuit according to a second embodiment of the present invention.

FIG. 3 schematically shows a power window switch circuit 200 according to a second embodiment of the present invention. The power window switch circuit 200 has a drive circuit 120 including a first relay 22 and a second relay 24, transistors TR1 to TR3, TR24 to TR26, diodes D21 to D28, and resistors R1 to R3, R21 to R26. Each of the diodes D21 to D28 functions to prevent back flow.

Between the plus terminal and the minus terminal of the battery power supply, the transistor TR1, the diode D21, the relay coil 21 for lowering the window glass, and the transistor TR3 are connected in series. Between the cathode of the diode D21 and the ground, the relay coil 23 for raising the window glass, and the transistor TR2 are connected in series. Between the plus terminal of the power supply and the base of the transistor TR1, the resistor R1 is connected. The transistor TR1 has a base connected via the resistor R2 to the control circuit 12. The transistors TR2 and TR3 have bases connected to the control circuit 12.

The DOWN switch 128 has a first movable contact 131 connected via the resistor 5 to the control circuit 12, a second movable contact 133 connected to the anode of the diode D25, and a second fixed contact DN2 connected to the minus terminal of the relay coil 23.

The UP switch 129 has a first movable contact 132 connected via the resistor 4 to the control circuit 12, a second movable contact 134 connected to the anode of the diode D25, and a second fixed contact UP2 connected to the minus terminal of the relay coil 21.

The leak detection circuit 15 has an electrode 17 connected via the base resistor R25 to a base of the transistor TR26. The resistor R24 is connected between the base of the transistor TR26 and the ground. The transistor TR26 has an emitter grounded and a collector connected to cathodes of the diodes D24 to D28. The diode D24 has an anode connected to a power line of the control circuit 12, and the resistor R26 is connected between the plus terminal of the power supply and the power line.

The diode D26 has an anode connected via the resistor R21 to the base of the transistor TR1 and the diode D27 has an anode connected via the resistor R22 to the base of the transistor TR24. The diode D28 has an anode connected via the resistor R23 to the base of the transistor TR25.

The transistor TR24 has an emitter connected to the first movable contact 131 of the DOWN switch 128 and a collector connected via the diode D22 to the minus terminal of the relay coil 23. The transistor TR25 has an emitter connected to the first movable contact 132 of the UP switch 129 and a collector connected via the diode D23 to the minus terminal of the relay coil 21.

In the second embodiment, the relay coil 23 constitutes a first relay coil while the relay coil 21 constitutes a second relay coil. The transistor TR24 constitutes a first switching element; the transistor TR25 constitutes a second switching element; the transistor TR26 constitutes a third switching element; and the transistor TR1 constitutes a fourth switching element.

Next, explanation will be given on operation of the power window switch circuit 200.

When the power window switch circuit 200 is not soaked by an electrolyte liquid such as rain and when the DOWN switch 128 and the UP switch 129 are both in the OFF state, no power supply voltage is supplied to the relay coils 21 and 23. Moreover, since the transistor TR1 is in the OFF state, the power supply voltage is not supplied to the plus terminals, either. Accordingly, the relay coils 21 and 23 are not excited. Consequently, the drive motor M is not driven and the window glass is not lowered or raised.

Next, when the DOWN switch 128 is turned on in this state, a first relay coil excitation signal is supplied via the first movable contact 131 to the control circuit 12, which in turn turns on the transistors TR1 and TR3, exciting the relay coil 21. As a result, the drive motor M is rotated in the normal direction to lower the window glass.

Next, when the UP switch 129 is turned on, a second relay coil excitation signal is supplied via the first movable contact 132 to the control circuit 12, which in turn turns on the transistors TR1 and TR3, exciting the relay coil 23. As a result, the drive motor M is rotated in the reverse direction to raise the window glass.

Next, when the power window switch circuit 200 is soaked by an electrolyte liquid such as rain and the DOWN switch 128 and the UP switch 129 are both in the OFF state, the leak detection circuit 15 is turned on and the transistors TR26 is turned on. In response to this ON operation of the transistor TR26, the transistor TR1 is turned on and the transistors TR24 and TR25 are set to a state in which they can be turned on. In response to the ON operation of the transistor TR1, the power supply voltage is supplied via the diode D21 to the plus terminals of the relay coils 21 and 23.

Moreover, in response to the ON operation of the transistor TR26, the minus terminals of the relay coils 21 and 23 are connected via the diode D25 to the ground. This excites the relay coils 21 and 23 and the relay contacts 25 and 26 are simultaneously turned on. Then, the power supply voltage is supplied to both the terminals of the drive motor M and the drive motor does not operate.

In response to the ON operation of the transistor TR26, the transistors TR24 and TR25 are set to a state where they can be turned on. However, since the switches 128 and 129 are off, the power supply voltage is not supplied to the emitters of the transistors TR24 and TR25. As a result, the transistors TR24 and TR25 are not turned on and no current flows between the emitter and the collector.

Thus, even if leak resistance is generated in the power window switch circuit 200, the power supply voltage is supplied to the respective plus terminals and the minus terminals are grounded, exciting the relay coils 21 and 23. Accordingly, the drive motor M does not operate. This prevents unintentional lowering or raising of the window glass.

Moreover, the power line (power supply circuit to the control circuit 12) of the control circuit 12 is connected via the diode D24 to the collector of the transistor TR26. Accordingly, the power line is set to a ground voltage by the ON operation of the transistor TR26. For this reason, when the power window switch circuit 200 is soaked, a predetermined power voltage required for the circuit operation is not supplied to the control circuit. Thus, an output signal from the control circuit 12 prevents malfunction of the drive circuit 220 (such as excitation of the relay coils 21 and 23 by the ON operation of the transistors TR1 to TR3).

Next, in this state, when the DOWN switch 128 is turned on, the power supply voltage is supplied from the plus terminal of the power supply via the fixed contact DN1 and the first movable contact 131 to the emitter of the transistor TR24. Then, the transistor TR24 is turned on and the power supply voltage is supplied via the diode D22 to the minus terminal of the relay coil 23. Both the terminals of the relay coil 23 are set to an identical potential and the relay coil 23 is set to the deexcited state. As a result, only the relay coil 21 is maintained in the excited state and the drive motor M is rotated in the normal direction to lower the window glass.

Next, when the UP switch 129 is turned on, the power supply voltage is supplied from the plus terminal of the power supply via the fixed contact UP1 and the first movable contact 132 to the emitter of the transistor TR25. Then, the transistor TR25 is turned on and the power supply voltage is supplied via the diode D23 to the minus terminal of the relay coil 21. Both the terminals of the relay coil 21 are set to an identical potential and the relay coil 21 is set to the deexcited state. As a result, only the relay coil 23 is maintained in the excited state and the drive motor M is rotated in the reverse direction to raise the window glass.

The power window switch circuit 200 of the second embodiment has advantages as follows.

(1) Even if the power window switch circuit 200 is soaked, it is possible to certainly lower or raise the window glass according to the ON operation of the DOWN switch 128 or the UP switch 129.

(2) When the power window switch circuit 200 is soaked and the DOWN switch 128 or the UP switch 129 is in the OFF state, unintentional lowering or raising of the window glass can be prevented.

(3) When the power window switch circuit 200 is soaked and the leak detection circuit 15 and the transistor TR26 are turned on, the power line of the control circuit 12 is grounded. Thus, it is possible to prevent output of a signal causing malfunction from the control circuit 12 to the drive circuit 220.

(4) If the DOWN switch 128 is turned on when the power window switch circuit 200 is soaked, electric current flows between the emitter and the collector of the transistor TR24 and excitation current is not supplied to the relay coil 23. Thus, only the relay coil 21 is excited to lower the window glass. That is, even if the power window switch circuit 200 is soaked, it is possible to assure lowering of the window glass.

(5) If the UP switch 129 is turned on when the power window switch circuit 200 is soaked, electric current flows between the emitter and the collector of the transistor TR25 and excitation current is not supplied to the relay coil 21. Thus, only the relay coil 23 is excited to raise the window glass. That is, even if the power window switch circuit 200 is soaked, it is possible to assure accurate rising of the window glass.

(6) When the DOWN switch 128 or the UP switch 129 is turned on, the first movable contact 131 or 132 is connected to the first fixed contact DN1 or UP1 after the second movable contact 133 or 134 is disconnected from the second fixed contact DN2 or UP2. Thus, it is possible to prevent short-circuit between the plus terminal of the power supply and the anode terminal of the diode D25.

It should be noted that the second embodiment may be modified as follows.

The transistors TR1, TR24, and TR25 used in the second embodiment are PNP transistors, but it is also possible to use NPN transistors. In this case, the transistor TR1 has a collector connected to the plus terminal of the power supply and an emitter connected to the anode of the diode D21. The transistor TR24 has a collector connected to the first movable contact 131 of the DOWN switch 128 and an emitter connected to the anode of the diode D22. Furthermore, the transistor TR25 has a collector connected to the first movable contact 132 of the UP switch 129 and an emitter connected to the anode of the diode 23.

The transistors TR2, TR3, and TR26 which are NPN transistors in this embodiment may be replaced by PNP transistors. In this case, the transistor TR2 has an emitter connected to the minus terminal of the relay coil 23 and a collector grounded. The transistor TR3 has an emitter connected to the minus terminal of the relay coil 21 and a collector grounded. Furthermore, the transistor TR26 has an emitter connected to the cathode of the diodes D24 to D28 and a collector grounded.

In the second embodiment, the transistors TR24 and TR25 were used, which may be replaced by a transistor array having two transistor elements. In this case, it is possible to reduce the size of the power window apparatus.

What is claimed is:

1. A power window switch circuit comprising:
   a first relay coil having a first terminal and a second terminal;
   a down switch connected to the first relay coil for lowering a window glass;
   a second relay coil having a first terminal and a second terminal; and
   an up switch connected to the second relay coil for raising the window glass, wherein each of the down switch and the up switch has a first fixed contact connected to a power supply, a second fixed contact connected to the ground, and a movable contact selectively connecting one of the first and second fixed contacts to the first terminal of the corresponding relay coil; wherein the movable contact includes a first movable contact as a normally open contact with respect to the first fixed contact and a second movable contact as a normally closed contact with respect to the second fixed contact, and wherein the first movable contact and the second movable contact move together and the first movable contact is connected to the first fixed contact after the second movable contact is disconnected from the second fixed contact;
   a first switching element connected between the second fixed contacts of the down and up switches and the ground and responsive to a soak detection signal, wherein the first switching element is also connected between the second terminals of the first and second relay coils and the ground; and
   a soak detection circuit for supplying the soak detection signal to the first switching element when detecting a soak.

2. A power window switch circuit comprising:
   a first relay coil having a first terminal and a second terminal;
   a down switch connected to the first relay coil for lowering a window glass;
   a second relay coil having a first terminal and a second terminal; and
   an up switch connected to the second relay coil for raising the window glass, wherein each of the down switch and the up switch has a first fixed contact connected to a power supply, a second fixed contact connected to the ground, and a movable contact selectively connecting one of the first and second fixed contacts to the first terminal of the corresponding relay coil; wherein the movable contact includes a first movable contact as a normally open contact with respect to the first fixed contact and a second movable contact as a normally closed contact with respect to the second fixed contact, and wherein the first movable contact is connected to the first fixed contact after the second movable contact is disconnected from the second fixed contact;
   a first switching element connected between the second fixed contacts of the down and up switches and the ground and responsive to a soak detection signal, wherein the first switching element is also connected between the second terminals of the first and second relay coils and the ground; and
   a soak detection circuit for supplying the soak detection signal to the first switching element when detecting a soak; and
   a back flow preventing element connected between the first movable contact and the second movable contact for preventing current flow from the second movable contact to the first movable contact.

3. The power window switch circuit according to claim 1, further comprising:
   a control circuit connected to the down switch and the up switch for outputting an excitation current supply signal when the movable contact of the down switch or the up switch is connected to the first fixed contact; and
   a second switching element connected between the power supply and the first terminals of the first and second relay coils for supplying an excitation current to the first terminals of the first and second relay coils in response to the excitation current supply signal from the control circuit.

4. The power window switch circuit according to claim 3, wherein the soak detection circuit is located at a position identical to or in the vicinity of the control circuit.

5. The power window switch circuit according to claim 3, wherein the second switching element is a transistor.

6. The power window switch circuit according to claim 3, further comprising invalidating means connected to the first and second switching elements for invalidating the operation of the second switching element in response to ON operation of the first switching element.

7. The power window switch circuit according to claim 6, wherein the invalidating means is a transistor.

8. A power window switch circuit comprising:
   a first relay coil having a first terminal and a second terminal;
   a down switch connected to the first relay coil for lowering a window glass;
   a second relay coil having a first terminal and a second terminal;
   an up switch connected to the second relay coil for raising the window glass, wherein the down switch includes a first fixed contact connected to a power supply, a second fixed contact connected to the first terminal of the first relay coil, and a first and a second movable contacts corresponding to the first and second fixed contacts, and wherein the up switch includes a third fixed contact connected to the power supply, a fourth fixed contact connected to the first terminal of the second relay coil, and a third and a fourth movable contacts corresponding to the third and fourth fixed contacts;
   a first switching element connected between the first movable contact of the down switch and the first terminal of the first relay coil;
   a second switching element connected between the third movable contact of the up switch and the first terminal of the second relay coil;
   a third switching element connected between the second and fourth movable contacts of the down switch and the up switch and the ground and responsive to a soak detection signal, wherein third switching element turns on one of the first and second switching elements when turned on in response to the soak detection signal; and
   a soak detection circuit for supplying the soak detection signal to the third switching element when detecting the soak.

9. The power window switch circuit according to claim 8, wherein each of the first to the third switching elements is a transistor.

10. The power window switch circuit according to claim 8, further comprising:
    a control circuit connected to the down switch and the up switch for outputting an excitation current supply signal when the first movable contact of the down switch is connected to the first fixed contact or when the third movable contact of the up switch is connected to the third fixed contact, wherein the control circuit receives electric power via a power supply line, and wherein the third switching element is also connected between the power supply line and the ground.

11. The power window switch circuit according to claim 10, wherein the soak detection circuit is located at a position identical to or in the vicinity of the control circuit.

12. The power window switch circuit according to claim 10, further comprising a fourth switching element connected between the power supply and the second terminals of the first and second relay coils for supplying an excitation current to the second terminals of the first and second relay coils in response to the excitation current supply signal from the control circuit, wherein the fourth switching element supplies the excitation current to the second terminals of the first and second relay coils when the third switching element is turned on in response to the soak detection signal.

13. The power window switch circuit according to claim 12, wherein the fourth switching element is a transistor.

14. The power window switch circuit according to claim 8, wherein the first and third movable contacts are constantly open contacts with respect to the first and third fixed contacts; the second and fourth movable contacts are constantly closed contacts with respect to the second and fourth fixed contacts; and wherein the first and third movable contacts are connected to the first and third fixed contacts after the second and fourth movable contacts are disconnected from the second and fourth fixed contacts.

15. The power window switch circuit according to claim 2, further comprising:
    a control circuit connected to the down switch and the up switch for outputting an excitation current supply signal when the movable contact of the down switch or the up switch is connected to the first fixed contact; and
    a second switching element connected between the power supply and the first terminals of the first and second relay coils for supplying an excitation current to the first terminals of the first and second relay coils in response to the excitation current supply signal from the control circuit.

16. The power window switch circuit according to claim 15, wherein the soak detection circuit is located at a position identical to or in the vicinity of the control circuit.

17. The power window switch circuit according to claim 15, wherein the second switching element is a transistor.

18. The power window switch circuit according to claim 15, further comprising invalidating means connected to the first and second switching elements for invalidating the operation of the second switching element in response to ON operation of the first switching element.

19. The power window switch circuit according to claim 18, wherein the invalidating means is a transistor.

* * * * *